US012765527B2

(12) United States Patent
Ushinohama et al.

(10) Patent No.: US 12,765,527 B2
(45) Date of Patent: Oct. 20, 2026

(54) FISHING ROD

(71) Applicant: GLOBERIDE, Inc., Higashikurume (JP)

(72) Inventors: Kosuke Ushinohama, Higashikurume (JP); Kenji Harada, Higashikurume (JP); Hiroshi Jojima, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/867,532

(22) PCT Filed: Apr. 12, 2023

(86) PCT No.: PCT/JP2023/014815
§ 371 (c)(1),
(2) Date: Nov. 20, 2024

(87) PCT Pub. No.: WO2024/024182
PCT Pub. Date: Feb. 1, 2024

(65) Prior Publication Data
US 2025/0338835 A1 Nov. 6, 2025

(30) Foreign Application Priority Data
Jul. 27, 2022 (JP) ................................ 2022-119674

(51) Int. Cl.
*A01K 87/06* (2006.01)

(52) U.S. Cl.
CPC .................................. *A01K 87/06* (2013.01)

(58) Field of Classification Search
CPC ...... A01K 87/06; A01K 87/08; A01K 87/008; A01K 87/009
See application file for complete search history.

(56) References Cited

U.S. PATENT DOCUMENTS 828,557 A * 8/1906 Levison ................ A01K 87/08 43/23
1,931,303 A * 10/1933 Sturgis .................. A01K 87/08 473/203
(Continued)

FOREIGN PATENT DOCUMENTS

CN 106982801 A 7/2017
DE 10239603 B3 * 1/2004 ............ A01K 87/06
(Continued)

OTHER PUBLICATIONS

Mar. 11, 2025 Office Action issued in Japanese Patent Application No. 2022-119674.
(Continued)

*Primary Examiner* — Katelyn T Truong
(74) *Attorney, Agent, or Firm* — Oliff PLC

(57) ABSTRACT

A fishing rod in which a finger is easily hooked on a tip end of a front grip and grip performance can be improved, and includes a rod; a reel seat inserted to the rod; and a front grip inserted closer to a rod tip side than the reel seat, in which the front grip comprises a tubular grip main body portion to which the rod is inserted, and a protrusion portion that is convex over a circumferential direction on the rod tip side of the grip main body portion. It is preferable that a distance L2 from a central axis O of the rod to a lower end of the protrusion portion is larger than a distance L1 from the central axis O of the rod to an upper end of the protrusion portion.

10 Claims, 6 Drawing Sheets

(56) References Cited

U.S. PATENT DOCUMENTS

| | | | | | |
|---|---|---|---|---|---|
| 2,177,433 | A * | 10/1939 | Hedge | A01K 87/08 | 43/23 |
| 2,180,323 | A * | 11/1939 | Maxwell | A01K 87/08 | 43/23 |
| 2,711,047 | A * | 6/1955 | Shepherd | A01K 87/08 | 43/25 |
| 4,577,432 | A * | 3/1986 | Brackett | A01K 87/08 | 43/18.1 R |
| D295,212 | S * | 4/1988 | MacNeil | D22/142 | |
| 4,850,130 | A * | 7/1989 | Childre | A01K 87/06 | 43/25 |
| 4,905,400 | A * | 3/1990 | Brackett | A01K 87/08 | D22/142 |
| 5,509,228 | A * | 4/1996 | Wright, Jr. | A01K 87/08 | 43/23 |
| 2006/0101702 | A1* | 5/2006 | LaCoste | A01K 87/08 | 43/25 |
| 2017/0360019 | A1 | 12/2017 | Tate | | |
| 2018/0020649 | A1* | 1/2018 | Kotarsky | A01K 87/08 | 43/23 |
| 2020/0037590 | A1 | 2/2020 | Taniguchi et al. | | |
| 2021/0259226 | A1 | 8/2021 | Rabbitt et al. | | |

FOREIGN PATENT DOCUMENTS

| | | | | | |
|---|---|---|---|---|---|
| JP | H09-275857 | A | 10/1997 | | |
| JP | 2001-000082 | A | 1/2001 | | |
| JP | 2001-028975 | A | 2/2001 | | |
| JP | 2001-197851 | A | 7/2001 | | |
| JP | 2008-104420 | A | 5/2008 | | |
| JP | 2017077218 | A * | 4/2017 | | A01K 87/08 |
| JP | 2020-018189 | A | 2/2020 | | |
| WO | WO-9403052 | A1 * | 2/1994 | | A01K 87/08 |

OTHER PUBLICATIONS

Jun. 13, 2023 Search Report issued in International Patent Application No. PCT/JP2023/014815.

Janaury 28, 2025 International Preliminary Report on Patentability issued in International Patent Application No. PCT/JP2023/014815.

Nov. 3, 2025 Office Action issued in Australian Patent Application No. 2023313157.

Apr. 13, 2026 Office Action issued in Chinese Patent Application No. 202380055902.2.

May 13, 2026 Office Action issued in Australian Patent Application No. 2023313157. .

May 31, 2026 Office Action issued in Singaporean Patent Application No. 11202408165X.

Aug. 10, 2026 Office Action issued in Chinese Patent Application No. 202380055902.2.

* cited by examiner

FISHING ROD

CROSS REFERENCE

The present application claims priority based on Japanese Patent Application No. 2022-119674 (filed on Jul. 27, 2022), the contents of which are incorporated herein by reference in their entirety.

TECHNICAL FIELD

The present invention relates to a fishing rod.

BACKGROUND ART

A fishing rod used for off-shore casting (boat fishing) has a structure in which a tip end portion of a front grip is less likely to be bent even if a fish is caught when fishing for a large fish such as yellowtail amberjack or Japanese amberjack. Therefore, a finger is hooked on the tip end portion of the front grip to grip the front grip, and the force of the arm is used to take in the fish. The front grip of the fishing rod used in the off-shore casting in the related art is known to be formed of a cylindrical soft member (for example, Patent Literature 1).

CITATION LIST

Patent Literature

Patent Literature 1: JP H09-275857 A

SUMMARY OF INVENTION

Technical Problem

As in Patent Literature 1, the front grip formed in a cylindrical shape has a problem that fingers slide on the front grip when the front grip is gripped by the fingers with force when a fish is caught because the fingers don't get caught in the front grip. In addition, since it is necessary to strongly grip the front grip in order to prevent the fingers from sliding, there is a problem that a load on the user is increased.

The present invention has been made to solve the above problems, and an object of the present invention is to provide a fishing rod in which a finger is easily hooked on a tip end of a front grip and grip performance can be improved.

Solution to Problem

A fishing rod according to an aspect of the present invention comprises a rod; a reel seat inserted to the rod; and a front grip inserted closer to a rod tip side than the reel seat, in which the front grip comprises a tubular grip main body portion to which the rod is inserted, and a protrusion portion that is convex over a circumferential direction on the rod tip side of the grip main body portion.

According to the present invention, since the protrusion portion formed over the circumferential direction is provided at the tip end of the grip main body portion, it is possible to hook a finger on the protrusion portion. As a result, when the tip end of the front grip is gripped, the finger is less likely to slide, and the tip end of the front grip can be easily gripped, so that the grip performance can be improved. In addition, since it is not necessary to hold the grip strongly as much as the finger is hooked on the protrusion portion, the load on the user can be reduced.

In addition, it is preferable that a distance from a central axis of the rod to a lower end of the protrusion portion is larger than a distance from the central axis of the rod to an upper end of the protrusion portion.

According to the present invention, since the finger can be easily hooked on the lower end of the protrusion portion, the grip performance can be further improved.

In addition, it is preferable that a radius of curvature of both lower side portions of the protrusion portion is larger than a radius of curvature of both upper side portions of the protrusion portion.

According to the present invention, since the lower side of the protrusion portion is tapered, it is easy to make the finger follow the protrusion portion, and the grip performance can be further improved.

In addition, it is preferable that the front grip comprises a tip end portion provided closer to the rod tip side than the protrusion portion, an upper portion of the tip end portion has a convex shape that is convex in a direction away from a central axis of the rod, and a lower portion of the tip end portion has a concave shape that is concave in a direction toward the central axis of the rod.

In addition, it is preferable that the front grip comprises a tip end portion provided closer to the rod tip side than the protrusion portion, and the tip end portion has a concave shape that is concave in a direction toward a central axis of the rod over a circumferential direction.

According to the present invention, since the finger can be easily hooked on the tip end portion, the grip performance can be further improved.

In addition, it is preferable that the front grip comprises a trigger portion that is spaced from the protrusion portion toward a rod base side and protrudes downward from the grip main body portion.

According to the present invention, since the finger can be disposed between the trigger portion and the protrusion portion, the grip performance can be further improved.

In addition, it is preferable that the trigger portion is provided at least one of a first region away from the protrusion portion by 10 to 40 mm and a second region away from the protrusion portion by 50 to 100 mm. According to the present invention, it is possible to further improve the grip performance without being limited by the size of the fingers.

Advantageous Effects of Invention

According to the present invention, it is possible to provide a fishing rod in which a finger is easily hooked on a tip end of a front grip and grip performance can be improved.

DESCRIPTION OF EMBODIMENTS

First Embodiment

Hereinafter, a first embodiment of a fishing rod of the present invention will be described with reference to the accompanying drawings. Note that in the description of the drawings, the same elements are denoted by the same reference signs, and duplicate descriptions will be omitted as appropriate. In the following description, "front-rear", "left-right", and "up-down" conform to the arrows in FIGS. 1 and 3. The direction is used for convenience of description, and does not limit the direction of the present invention.

Figure 1:
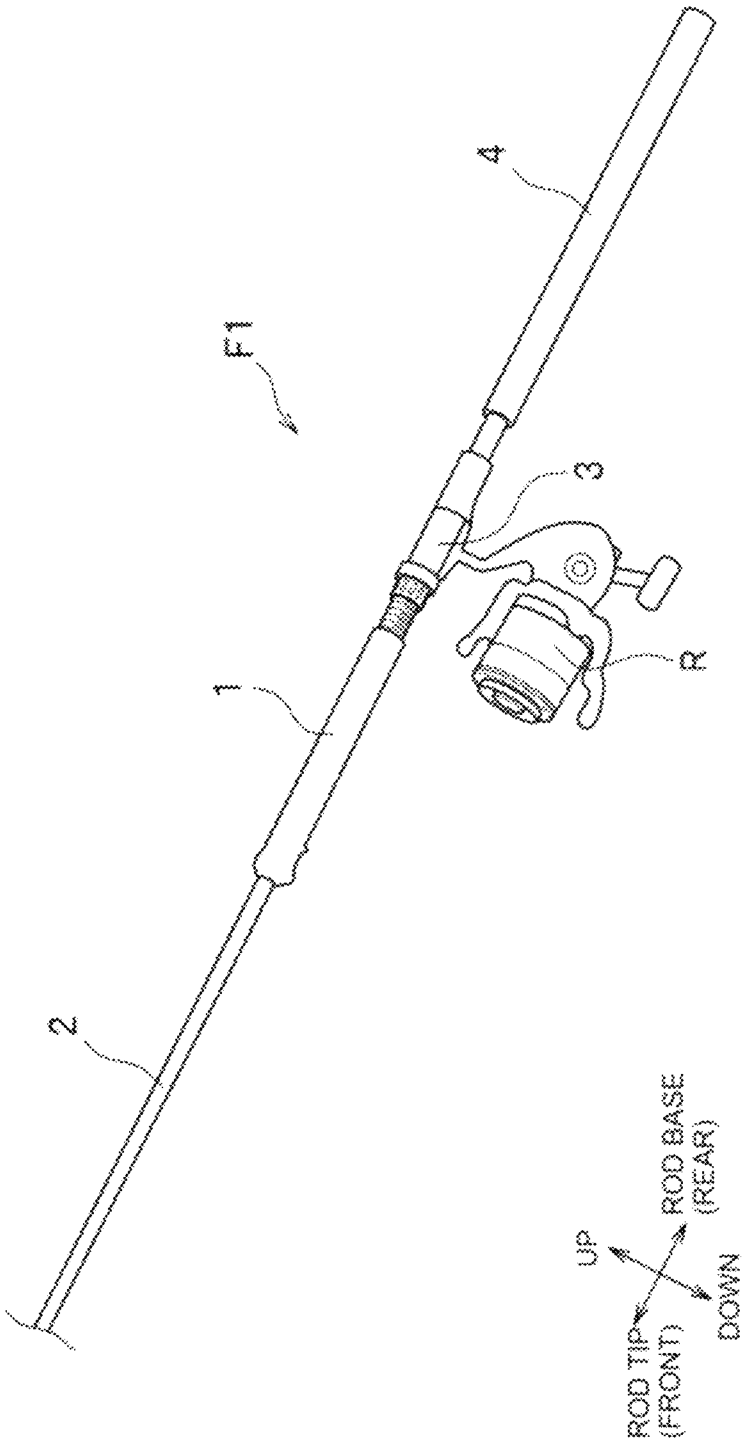
FIG. 1 is a side view illustrating a fishing rod according to a first embodiment of the present invention.

As illustrated in FIG. 1, a fishing rod F1 comprises a front grip 1, a rod 2, a reel seat 3, a rear grip 4. The fishing rod F1 is configured by inserting the rod 2 into the front grip 1, the reel seat 3, and the rear grip 4 in this order from a rod tip side.

The front grip 1 is a cylindrical member gripped by a user. The front grip 1 is formed of, for example, a flexible member such as natural cork, artificial cork, or ethylene vinyl acetate copolymer (EVA) of a foamable resin. A hollow portion having a circular cross section is formed inside the front grip 1, and the rod 2 is inserted into the hollow portion. The front grip 1 is fixed to the rod 2 by adhesion. The front grip 1 has a length of, for example, about 10 to 30 cm. Details of the front grip 1 will be described later.

The rod 2 is a cylindrical member as a main body of the fishing rod F1. The rod 2 may be constituted by one rod or a joint structure constituted by a plurality of rods.

The reel seat 3 is a tubular member to which a fishing reel R is detachably fixed. A material of the reel seat 3 is not particularly limited, but in the present embodiment, the reel seat 3 is formed of a resin in consideration of weight reduction. The rod 2 is inserted into the hollow portion in the reel seat 3 and fixed by adhesion.

The rear grip 4 is a cylindrical member. The rear grip 4 is formed of, for example, a flexible member such as natural cork, artificial cork, or ethylene vinyl acetate copolymer (EVA) of a foamable resin. A hollow portion having a circular cross section is formed inside the rear grip 4, and the rod 2 is inserted into the hollow portion. The rear grip 4 is fixed to the rod 2 by adhesion. The rear grip 4 is operated by being gripped by the user or by being brought into contact with the user's armpit, abdomen, leg, or the like. The rear grip 4 has a length of, for example, about 20 to 60 cm.

Figure 2:
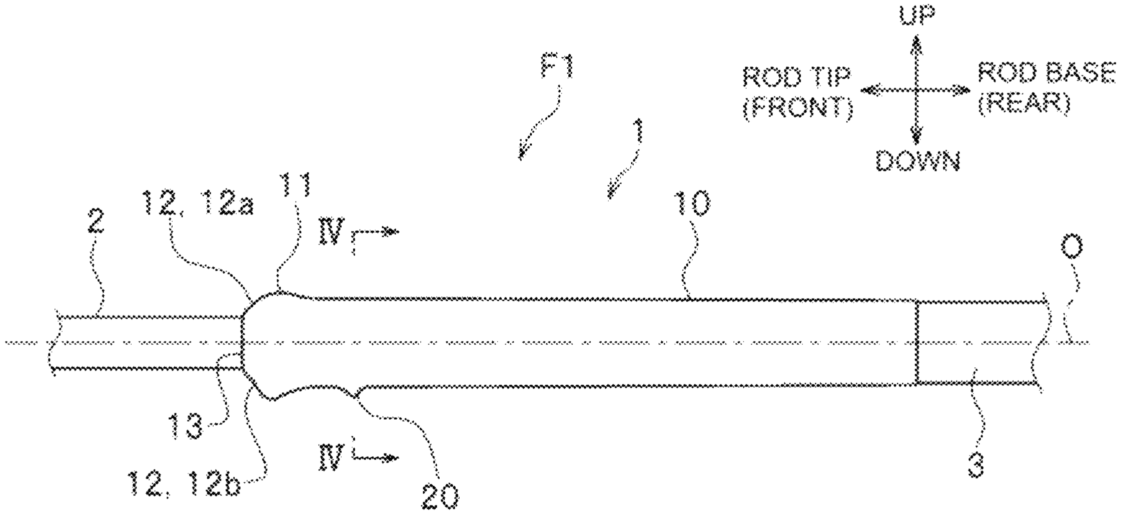
FIG. 2 is a side view illustrating a front grip according to the first embodiment.

As illustrated in FIG. 2, the front grip 1 comprises a grip main body portion 10, a protrusion portion 11, a tip end portion 12, and a first trigger portion 20. The grip main body portion 10 has a substantially cylindrical shape.

The protrusion portion 11 is formed on the front end side of the grip main body portion 10 to protrude radially outward over the entire circumferential direction of the grip main body portion 10. That is, the protrusion portion 11 has a larger diameter than the grip main body portion 10. The protrusion portion 11 is a portion on which the user hooks a finger when gripping the front grip 1. The protrusion portion 11 is formed at a position of, for example, about 5 mm to 3 cm from an end 13.

Figure 3:
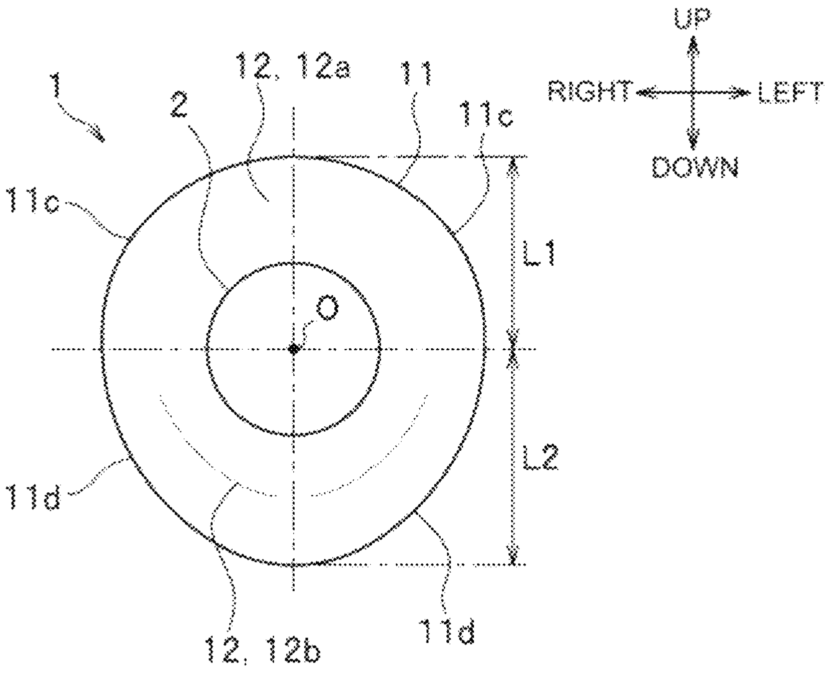
FIG. 3 is a front view illustrating the front grip according to the first embodiment.

As illustrated in FIG. 3, the protrusion portion 11 has an asymmetric shape in an up-down direction. That is, the size of the protrusion portion 11 in the up-down direction is formed to satisfy L2>L1 when the distance from a central axis O to the upper end (uppermost portion) of the protrusion portion 11 is L1 and the distance from the central axis O to the lower end (lowermost portion) of the protrusion portion 11 is L2. In addition, the distance from the left end of the protrusion portion 11 to the central axis O and the distance from the right end of the protrusion portion 11 to the central axis O are formed to be substantially equal. That is, the left and right shapes of the protrusion portion 11 are substantially symmetrical.

The radius of curvature of lower side portions 11*d* and 11*d* of the protrusion portion 11 is larger than the radius of curvature of upper side portions 11*c* and 11*c*. That is, the lower side of the protrusion portion 11 is slightly tapered as compared with the upper side.

As illustrated in FIG. 2, the tip end portion 12 is a portion formed from the end 13 of the grip main body portion 10 to the protrusion portion 11. An upper portion 12*a* of the tip end portion 12 has a convex shape that is convex in a direction away from the central axis O. That is, the upper portion 12*a* of the tip end portion 12 has a curved surface that bulges upward when viewed from the side. The convex shape is formed on the entire upper half circumference or a part of the tip end portion 12. On the other hand, a lower portion 12*b* of the tip end portion 12 has a concave shape that is concave in a direction toward the central axis O. The concave shape is formed on the entire lower half circumference or a part of the tip end portion 12.

Figure 4:
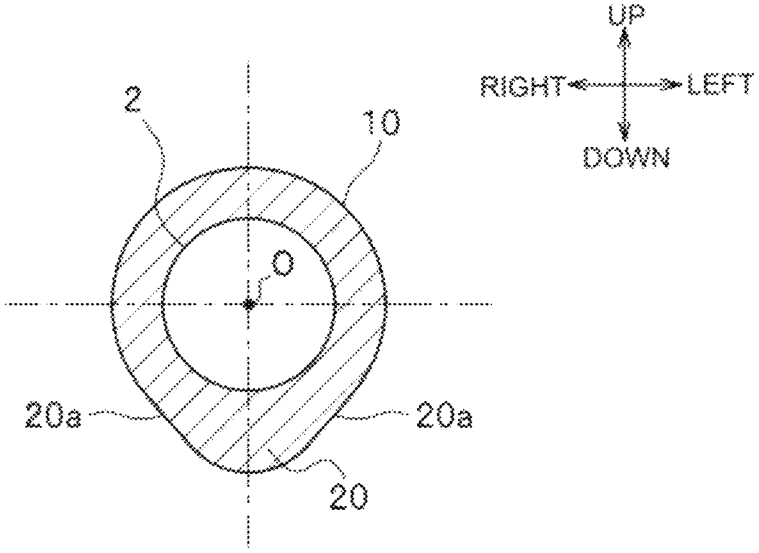
FIG. 4 is a cross-sectional view taken along line IV-IV of FIG. 2.

As illustrated in FIG. 2, the first trigger portion 20 is formed in a first region away from the protrusion portion 11 by about 10 to 40 mm in the direction toward the reel seat 3. The first trigger portion 20 is a portion protruding downward from the lower portion of the grip main body portion 10. The amount of protrusion of the first trigger portion 20 (the distance from the outer peripheral surface of the grip main body portion 10 to the tip end of the first trigger portion 20) may be appropriately set, but in the present embodiment, the amount of protrusion is substantially the same as or smaller than the amount of protrusion of the protrusion portion 11. The distance between the protrusion portion 11 and the first trigger portion 20 is assumed to be a distance within which one finger fits. As illustrated in FIG. 4, in a cross-sectional view, both side portions 20*a* and 20*a* of the first trigger portion 20 have a recessed shape slightly recessed toward the central axis O. Note that although formed in this manner in the present embodiment, the first trigger portion 20 may protrude downward, and the shapes of the side portions 20*a* and 20*a* may be appropriately designed.

Figure 5:
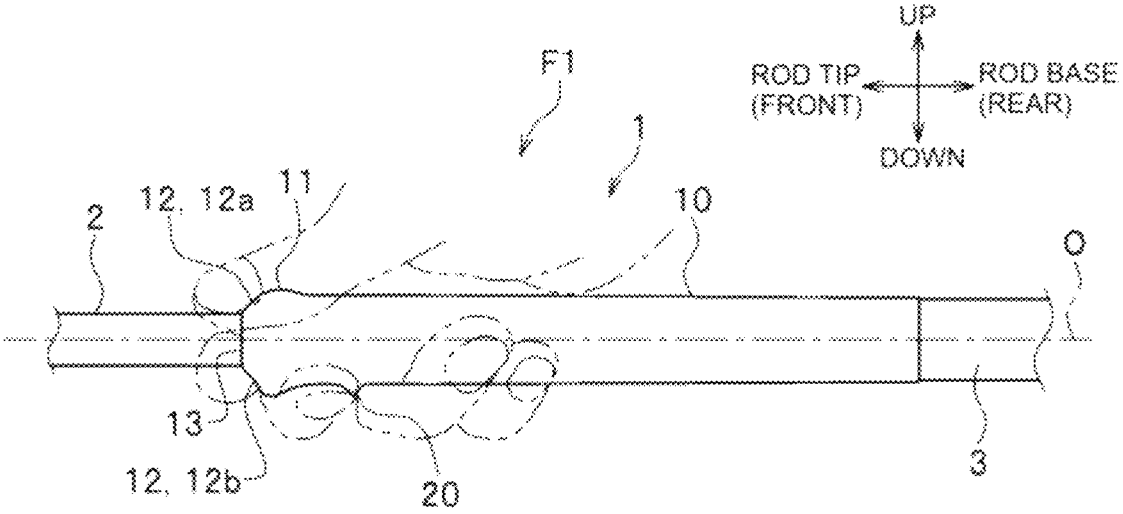
FIG. 5 is a side view illustrating a state in which the front grip according to the first embodiment is gripped.

FIG. 5 is a side view illustrating a state in which the front grip according to the first embodiment is gripped. As illustrated in FIG. 5, the user grips the front grip 1 with the front hand (right hand in this case) to wrap around the tip end of the front grip 1. At this time, the thumb is brought into contact with the upper portion 12*a* of the tip end portion 12 and the rod 2 from the protrusion portion 11. The index finger is brought into contact with the lower portion 12*b* of the tip end portion 12 and the rod 2. The middle finger is brought into contact between the protrusion portion 11 and the first trigger portion 20. That is, the protrusion portion 11 is sandwiched between the index finger and the middle finger. The ring finger and the little finger are brought into contact with the grip main body portion 10 on the rod base side with respect to the first trigger portion 20. That is, the first trigger portion 20 is sandwiched between the middle finger and the ring finger. Note that the gripping state illustrated in FIG. 5 is merely an example, and the gripping can be made by appropriately placing the fingers according to the user's preference.

With the fishing rod F1 of the present embodiment described above, since the protrusion portion 11 formed over the circumferential direction is provided at the tip end of the grip main body portion 10, the user can hook the finger on the protrusion portion 11 when gripping the front grip 1. As a result, the finger is less likely to slide, and the tip end of the front grip 1 can be easily gripped, so that the grip performance can be improved. In addition, since it is not necessary to hold the grip strongly as much as the finger is hooked on the protrusion portion 11, the load on the user can be reduced. In addition, the distance L2 from the central axis O to the lower end of the protrusion portion 11 is larger than the distance L1 from the central axis O to the upper end of the protrusion portion 11. Therefore, fingers can be easily hooked to the front and back of the protrusion portion 11 on the lower side, and the grip performance can be further improved.

In addition, the radius of curvature of both the lower side portions 11*d* and 11*d* of the protrusion portion 11 is larger than the radius of curvature of both the upper side portions 11*c* and 11*c* of the protrusion portion 11. That is, since the lower end of the protrusion portion 11 has a tapered shape, fingers can be easily hooked. Accordingly, the grip performance can be further improved.

In addition, the upper portion 12*a* of the tip end portion 12 has a convex shape that is convex in a direction away from the central axis O, and the lower portion 12*b* of the tip end portion 12 has a concave shape that is concave in a direction toward the central axis O of the rod 2. Therefore, on the upper side of the tip end portion 12, the thumb is easily hooked to the convex shape of the upper portion 12*a*, and on the lower side of the tip end portion 12, the index finger fits to the concave portion of the lower portion 12*b*, so that the grip performance can be further improved. In addition, since a step is formed between the tip end portion 12 and the rod 2 over the circumferential direction, fingers (a thumb and an index finger in this case) can be easily hooked.

In addition, since the first trigger portion 20 spaced apart from the protrusion portion 11 toward the rod base side and protruding downward from the grip main body portion 10 is provided, a finger can be disposed between the first trigger portion 20 and the protrusion portion 11, and the grip performance can be improved. That is, by providing the first trigger portion 20, the grip performance can be synergistically improved together with the protrusion portion 11 and the tip end portion 12. In addition, at this time, the first trigger portion 20 is formed in the first region away from the protrusion portion 11 by 10 to 40 mm in the direction toward the reel seat 3, so that the size of the finger is not limited, and the first trigger portion 20 can be adapted to a wide range of users.

Note that, although the present embodiment is configured as described above, other forms may be used. For example, the protrusion portion 11 may have a circular cross section or may be left-right asymmetric. In addition, the tip end portion 12 has the upper portion 12*a* in a convex shape and the lower portion 12*b* in a concave shape, but may have a convex shape or a concave shape over the entire circumference. In addition, the tip end portion 12 may be an inclined surface inclined from the rod 2 to the protrusion portion 11.

Second Embodiment

Figure 6:
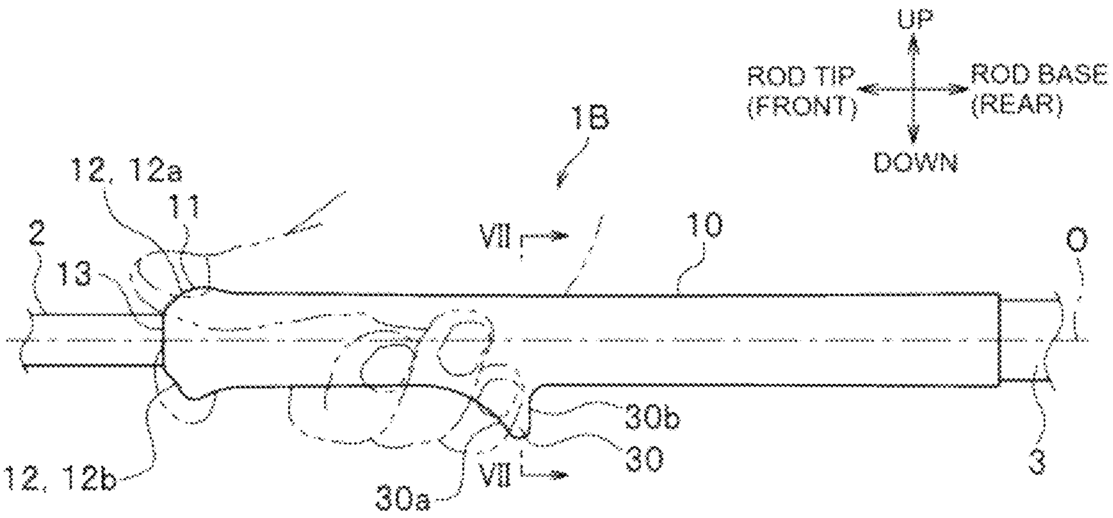
FIG. 6 is a side view illustrating a state in which a front grip according to a second embodiment is gripped.

Next, a front grip according to a second embodiment of the present invention will be described. As illustrated in FIG. 6, a front grip 1B does not comprise the first trigger portion 20, but comprises the grip main body portion 10, the protrusion portion 11, the tip end portion 12, and a second trigger portion 30. The grip main body portion 10, the protrusion portion 11, and the tip end portion 12 are the same as those in the first embodiment.

The second trigger portion 30 is formed in a second region away from the protrusion portion 11 by about 50 to 100 mm. The second trigger portion 30 is a portion protruding downward from the lower portion of the grip main body portion 10. The second trigger portion 30 is formed slightly forward from the center in the central axis O direction.

Figure 7:
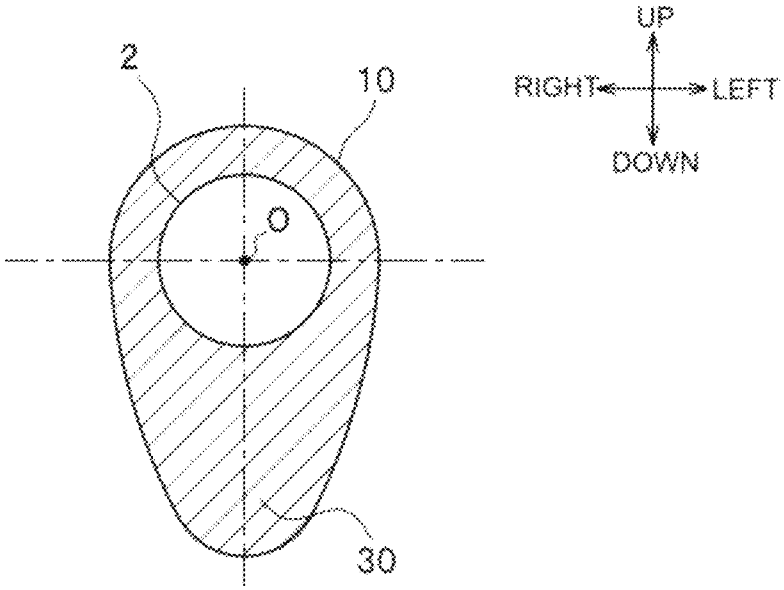
FIG. 7 is a cross-sectional view taken along line VII-VII of FIG. 6.

As illustrated in FIG. 6, the second trigger portion 30 comprises a front surface 30*a* and a rear surface 30*b*. The rear surface 30*b* rises perpendicularly to the outer peripheral surface of the grip main body portion 10. The front surface 30*a* is gently inclined forward from the tip end of the rear surface 30*b*. As illustrated in FIG. 7, the second trigger portion 30 is tapered downward. The height of the second trigger portion 30 may also be appropriately set, but in the present embodiment, the second trigger portion 30 is assumed to have a height of about 5 to 20 mm.

As illustrated in FIG. 6, in the present embodiment, the thumb and the index finger are arranged in the same manner as in the first embodiment, and the middle finger, the ring finger, and the little finger are brought into contact with the front side of the second trigger portion 30.

According to the present embodiment, it is possible to obtain substantially the same effects as those of the first embodiment described above. In addition, according to the present embodiment, since the little finger can be hooked on the second trigger portion 30, the grip performance can be improved. Other configurations and effects of the second embodiment are the same as those of the first embodiment, and thus description thereof is omitted. Note that, for example, the second trigger portion 30 may be gripped to be sandwiched between the ring finger and the little finger.

Third Embodiment

Figure 8:
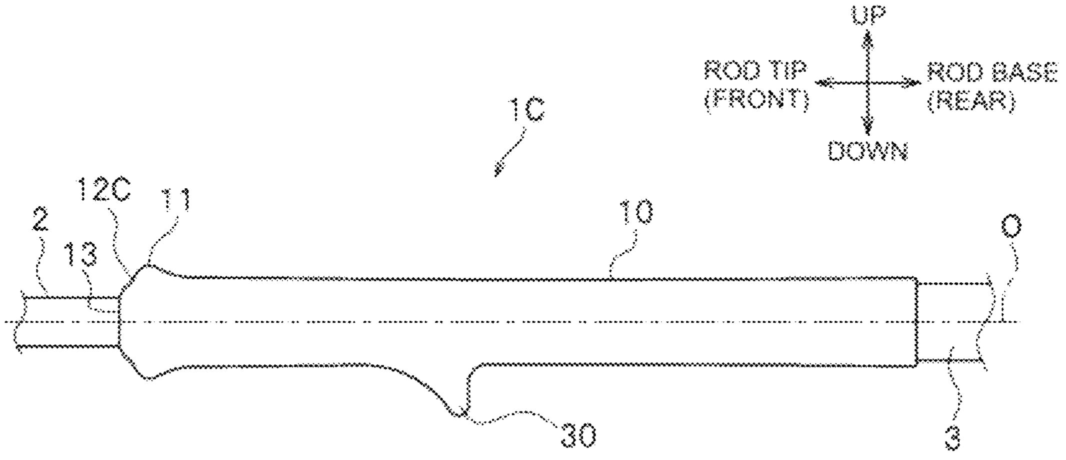
FIG. 8 is a side view illustrating a front grip according to a third embodiment.

Next, a front grip according to a third embodiment of the present invention will be described. As illustrated in FIG. 8, a front grip 1C is different from that of the first embodiment in the shape of a tip end portion 12C. The front grip 1C does not comprise the first trigger portion 20, but comprises the grip main body portion 10, the protrusion portion 11, the tip end portion 12C, and the second trigger portion 30. The grip main body portion 10, the protrusion portion 11, and the second trigger portion 30 are the same as those in the above-described embodiments. The tip end portion 12C has a concave shape that is concave in the direction toward the central axis O over the entire circumferential direction.

The same effects as those of the first embodiment can be obtained by the front grip 1C described above. In addition, by forming the tip end portion 12C into a concave shape over the entire circumference, the thumb and the index finger can fit to the concave portion. Other configurations and effects of the third embodiment are substantially the same as those of the first embodiment and the second embodiment, and thus description thereof is omitted.

Fourth Embodiment

Figure 9:
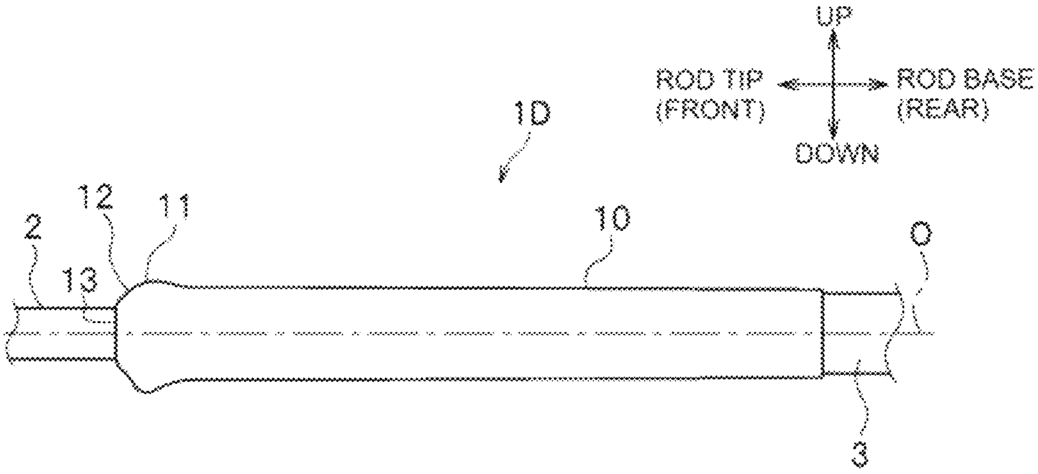
FIG. 9 is a side view illustrating a front grip according to a fourth embodiment.

Next, a front grip according to a fourth embodiment of the present invention will be described. As illustrated in FIG. 9, a front grip 1D does not comprise a trigger portion. That is, the front grip 1D comprises the grip main body portion 10, the protrusion portion 11, and the tip end portion 12. With such a front grip 1D, it is also possible to achieve the same effects as those of the first embodiment for the protrusion portion 11 and the tip end portion 12. In addition, since the front grip 1D has few protrusions of the grip main body portion 10, there are few limitations on how to grip and hold the grip main body portion 10, and the front grip 1D can be applied to a wide range of users.

The embodiments according to the invention of the present application have been described above. The present invention is not limited to the embodiments described above, and respective components can be appropriately modified without departing from the spirit of the present invention. For example, both the first trigger portion 20 and the second trigger portion 30 may be provided. In addition, a trigger portion having a shape different from those of the first trigger portion 20 and the second trigger portion 30 may be separately formed.

REFERENCE SIGNS LIST

F1 fishing rod
1 front grip
2 rod
3 reel seat
10 grip main body portion
11 protrusion portion
12 tip end portion
13 end
20 first trigger portion (trigger portion)
30 second trigger portion (trigger portion)

The invention claimed is:

1. A fishing rod comprising:
a rod;
a reel seat inserted to the rod and configured to hold a reel at a lower radial side of the rod; and
a front grip inserted closer to a rod tip side than the reel seat,
wherein the front grip comprises
a tubular grip main body portion to which the rod is inserted,
a protrusion portion that is convex over a circumferential direction on the rod tip side of the grip main body portion, and
a tip end portion that is continuous from the protrusion portion and located at a tip of the grip main body portion that is closer to the rod tip side than the protrusion portion and abuts an exposed portion of the rod,
wherein an upper portion of the tip end portion at an upper radial side of the rod has a convex shape that is convex in a direction away from the central axis of the rod and is a curved surface bulging upwardly from the grip main body portion when viewed from a side of the front grip, and a lower portion of the tip end portion at the lower radial side of the rod has a concave shape that is a concave in a direction toward the central axis of the rod.

2. The fishing rod according to claim 1, wherein a distance from a central axis of the rod to a lower end of the protrusion portion is larger than a distance from the central axis of the rod to an upper end of the protrusion portion.

3. The fishing rod according to claim 1, wherein a radius of curvature of each half of a lower radial side of the protrusion portion is larger than a radius of curvature of each half of the upper radial side of the protrusion portion.

4. The fishing rod according to claim 1,
wherein the concave shape extends over a circumferential direction of the rod.

5. The fishing rod according to claim 1, wherein the front grip comprises a trigger portion that is spaced from the protrusion portion toward a rod base side and protrudes downward from the grip main body portion.

6. The fishing rod according to claim 5, wherein the trigger portion is either (i) spaced away from the protrusion portion by a distance that is in a range of 10 to 40 mm; or (ii) spaced away from the protrusion portion by a distance that is in a range of 50 to 100 mm.

7. The fishing rod according to claim 5, wherein the trigger portion is spaced away from the reel seat toward the rod tip side.

8. The fishing rod according to claim 1, wherein the fishing rod is configured as an off-shore casting rod.

9. The fishing rod according to claim 1, wherein the reel is a spinning reel and the reel seat is configured to hold the spinning reel.

10. The fishing rod according to claim 1, where the front grip forms a step between the tip end portion and the rod over the circumferential direction.

* * * * *